United States Patent
Jang et al.

(10) Patent No.: US 12,546,694 B2
(45) Date of Patent: Feb. 10, 2026

(54) METHOD AND APPARATUS FOR DETECTING ACIDITY OF AIRBORNE PARTICLES

(71) Applicant: UNIVERSITY OF FLORIDA RESEARCH FOUNDATION, INCORPORATED, Gainesville, FL (US)

(72) Inventors: Myoseon Jang, Gainesville, FL (US); Zechen Yu, Gainesville, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 935 days.

(21) Appl. No.: 17/778,130

(22) PCT Filed: Oct. 26, 2020

(86) PCT No.: PCT/US2020/057307
§ 371 (c)(1),
(2) Date: May 19, 2022

(87) PCT Pub. No.: WO2021/101667
PCT Pub. Date: May 27, 2021

(65) Prior Publication Data
US 2022/0349805 A1 Nov. 3, 2022

Related U.S. Application Data

(60) Provisional application No. 62/938,245, filed on Nov. 20, 2019.

(51) Int. Cl.
*G01N 15/06* (2024.01)
*G01N 15/00* (2024.01)
(Continued)

(52) U.S. Cl.
CPC ......... *G01N 15/0618* (2013.01); *G01N 21/78* (2013.01); *G01N 21/85* (2013.01);
(Continued)

(58) Field of Classification Search
CPC ....... G01N 15/0618; G01N 2015/0038; G01N 2021/8578; G01N 21/78; G01N 21/85; G01N 21/94; H04N 13/189
(Continued)

(56) References Cited

U.S. PATENT DOCUMENTS 8,557,184 B2   10/2013   Jang
2012/0176498 A1*   7/2012   Haas ................. G01N 21/84
                                                    348/148
(Continued)

FOREIGN PATENT DOCUMENTS

CN   205138961 U   *   4/2016
CN   206074314 U   *   4/2017
(Continued)

OTHER PUBLICATIONS

PCT/US2020/057307, PCT Search Report and written opinion mailed Apr. 5, 2021, 15 pages.
(Continued)

*Primary Examiner* — Laura Martin
*Assistant Examiner* — Nashmiya S Fayyaz
(74) *Attorney, Agent, or Firm* — Timothy H. Van Dyke; Wolter Van Dyke Davis, PLLC

(57) ABSTRACT

A method is provided for detecting a composition of airborne particles. The method includes directing, with a pump, gas including particulate matter through a filter including an indicator dye. The method further includes causing a color change in the filter based on the particulate matter binding to the indicator dye. The method further includes transmitting, with an optical source, an optical signal at the filter. The
(Continued)

method further includes detecting, with an imaging device, a reflected signal from the filter. The method further includes determining, with a processor, a value of a parameter of the particulate matter based on the color change, wherein the color change is based on the detected reflected signal.

17 Claims, 11 Drawing Sheets

(51) Int. Cl.
G01N 21/78 (2006.01)
G01N 21/85 (2006.01)
H04N 13/189 (2018.01)

(52) U.S. Cl.
CPC ... *H04N 13/189* (2018.05); *G01N 2015/0038* (2013.01); *G01N 2021/8578* (2013.01)

(58) Field of Classification Search
USPC .............................................. 73/28.01, 61.71
See application file for complete search history.

(56) References Cited

U.S. PATENT DOCUMENTS

| | | | |
|---|---|---|---|
| 2013/0286171 A1 | 10/2013 | Haas et al. | |
| 2014/0266682 A1 | 9/2014 | Gettings et al. | |
| 2018/0104374 A1* | 4/2018 | Kim | B01J 35/39 |

FOREIGN PATENT DOCUMENTS

| | | | | |
|---|---|---|---|---|
| CN | 104777082 B | * | 10/2017 | |
| NL | 7407776 A | * | 1/1975 | G01N 15/0205 |
| WO | WO-2017160646 A2 | * | 9/2017 | A62B 23/02 |
| WO | 2021101667 A1 | | 5/2021 | |

OTHER PUBLICATIONS

Jang, M. et al., "Colorimetric Particle Acidity Analysis of Secondary Organic Aerosol Coating on Submicron Acidic Aerosols", Aerosol Sci. Technol., 2008, vol. 42, No. 6, pp. 409-420.

Li, J. et al., "Aerosol Acidity Measurement Using Colorimetry Coupled with a Reflectance UV-Visible Spectrometer", Aerosol Sci. Technol., 2012, vol. 46, pp. 833-842.

* cited by examiner

METHOD AND APPARATUS FOR DETECTING ACIDITY OF AIRBORNE PARTICLES

CROSS-REFERENCE TO RELATED APPLICATIONS

This application claims benefit of Provisional Application No. 62/938,245, filed Nov. 20, 2019, under 35 U.S.C. § 119(e).

STATEMENT OF GOVERNMENTAL INTEREST

This invention was made with government support under Grant No. 1923651 awarded by the National Science Foundation. The government has certain rights in the invention.

BACKGROUND

The ability to determine a composition (e.g. a level of acidity) of airborne matter is important. The presence of certain compounds in the air (e.g. sulfuric acid), can have adverse health effects. In addition, the measure of aerosol acidity has important implications for public health and workplace conditions. For example, research has shown that there may be a strong correlation between aerosol hydronium concentration and many problems associated with air pollution. The detection of pollutants (e.g. acidic pollutants) is also very important in the many working environments such as the mining industry, fertilizer manufacturing, air plumes from waste landfills, coal power plants, petroleum refineries and offices located in polluted city areas.

SUMMARY

It is here recognized that conventional methods used to detect airborne particles are deficient. For example, conventional methods are known which use a charge-coupled device (CCD) to detect any aerosol using light scattering of aerosols. However, the inventors of the present invention recognized that this conventional method merely determines whether any aerosol is present and thus does not focus on a specific chemical species in the aerosols. Additionally, conventional methods have been developed which use a CCD to capture fluorescence and measure acidic pH in an aqueous solution. However, the inventors of the present invention recognized that this conventional method is limited to measuring acidic pH in an aqueous solution and thus cannot detect the acidity in an aerosol using a CCD. Thus, the inventors of the present invention developed the system and method discussed herein, to overcome one or more of the above drawbacks of conventional methods.

In a first set of embodiments, a method is provided for detecting a composition of airborne particles. The method includes directing, with a pump, gas including particulate matter through a filter including an indicator dye. The method further includes causing a color change in the filter based on the particulate matter binding to the indicator dye. The method further includes transmitting, with an optical source, an optical signal at the filter. The method further includes detecting, with an imaging device, a reflected signal from the filter. The method further includes determining, with a processor, a value of a parameter of the particulate matter based on the color change, wherein the color change is based on the detected reflected signal.

In a second set of embodiments, a system is provided for detecting a composition of airborne particles. The system includes a filter including an indicator dye. The system also includes a pump configured to direct gas including particulate matter through the filter. The system further includes an optical source configured to transmit an optical signal at the filter. The system further includes an imaging device configured to detect a reflected signal from the filter. The system further includes a processor and a memory including one or more sequences of instructions. The memory and the sequences of instructions are configured to, with the processor, cause the system to direct gas including the particulate matter through the filter and cause a color change in the filter based on the particulate matter binding to the indicator dye. The memory and sequences of instructions are further configured to cause the system to transmit the optical signal at the filter and detect the reflected signal from the filter. The memory and sequences of instructions are further configured to cause the system to determine a value of a parameter of the particulate matter based on the color change, where the color change is based on the detected reflected signal.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

A method and apparatus are described for detecting a chemical composition of airborne particles. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2λ, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of detecting a composition of airborne particles. In other embodiments, the invention is described in the context of detecting a quantity of a chemical composition (e.g. level of acidity) of particulate matter in an aerosol.

Figure 1A:
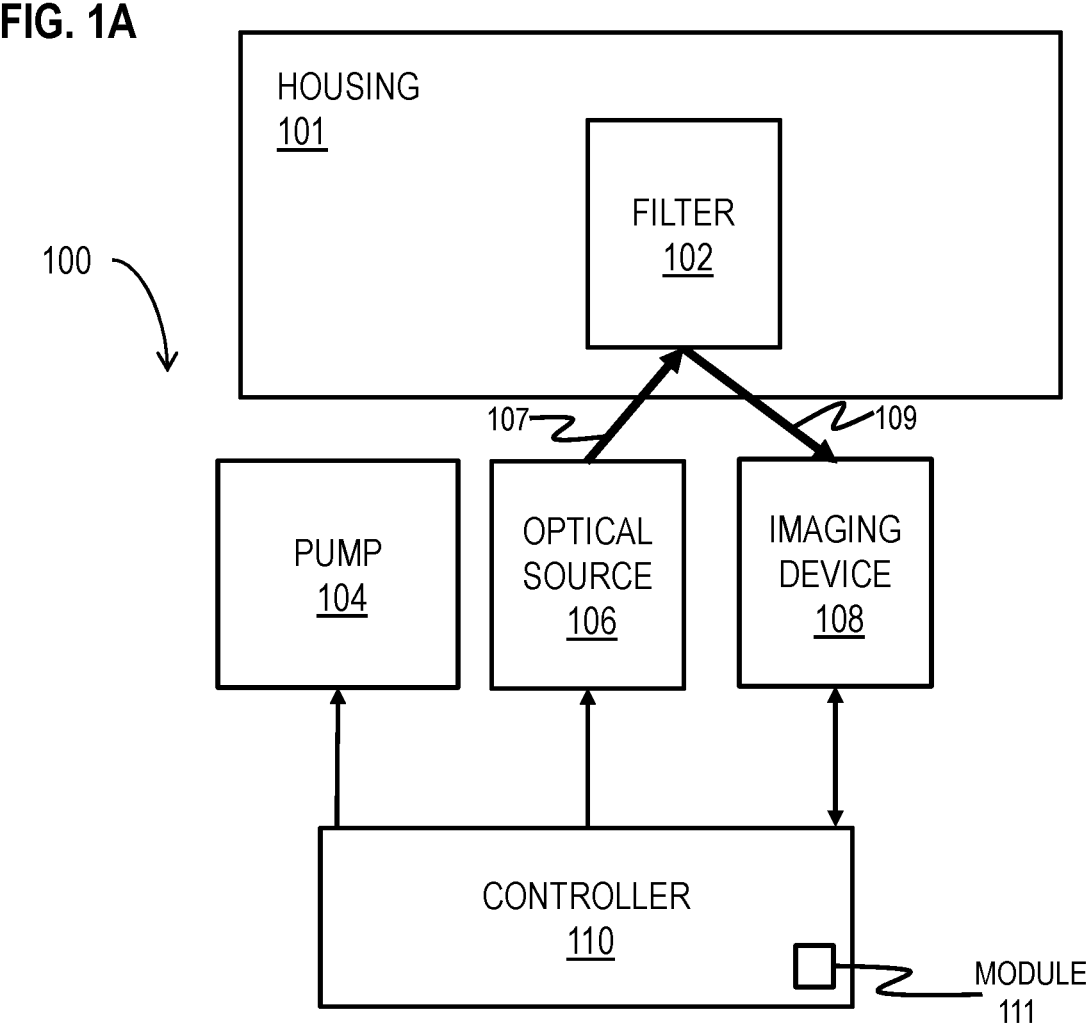
FIG. 1A is a block diagram that illustrates an example system for detecting a composition of airborne particles, according to an embodiment.

FIG. 1A is a block diagram that illustrates an example system 100 for detecting a composition of airborne particles, according to an embodiment. In an embodiment, the system 100 includes a housing 101 that holds a filter 102 that has an indicator dye that causes the filter 102 to change color when exposed to particulate matter (e.g. acid) in a gas or aerosol that passes through the filter 102. In one example embodiment, particulate matter in the gas or aerosol binds to the indicator dye in the filter 102, causing the color change in the filter 102. In an example embodiment, the filter 102 and indicator dye are selected so that the change in color is in the visible spectrum (e.g. from about 400 nanometers to about 700 nanometers in wavelength). However, in other embodiments, the change in color is outside the visible spectrum (e.g. ultraviolet, infrared, etc.). In another embodiment, the system 100 includes a pump 104 that draws a gas or aerosol through the filter 102. In one embodiment, the pump 104 is any mechanical pump (e.g., diaphragm pump). In an example embodiment, the pump 104 has a sampling flowrate in range from about 2 liters per minute (L/minute) to about 30 L/minute that can be applied to the system. In one embodiment, the flow rate of the pump 104 needs to be stable during the sampling period (e.g. the time period over which the color change of the filter is measured for purposes of detecting the composition of airborne particles passing through the filter). In an example embodiment, the sampling flowrate is pre-tested with the type of pump and filter that are used. In one example embodiment, the pump 104 is the polypropylene diaphragm pump (e.g. Model #2200-201-SB, Delavan Fluid Power®, USA). In another example embodiment, the pump 104 is an electric diaphragm sprayer pump (e.g. Model #EF1000-BOX, EVERFLO® Pumps, USA). In an example embodiment the pump 104 is located adjacent an outlet of the housing 101 and causes the gas or aerosol to be drawn into an inlet of the housing 101 in flow communication with the outlet. In this example embodiment, the filter 102 is secured or mounted within the housing 101 along a channel in flow communication between the inlet and the outlet. In one example embodiment, the pump 104 is positioned within the housing 101 (e.g. within the channel in flow communication between the inlet and the outlet that the gas or aerosol passes through the filter 102). In another example embodiment, the pump 104 is positioned outside the housing 101 (e.g. in flow communication with the outlet).

Figure 1B:
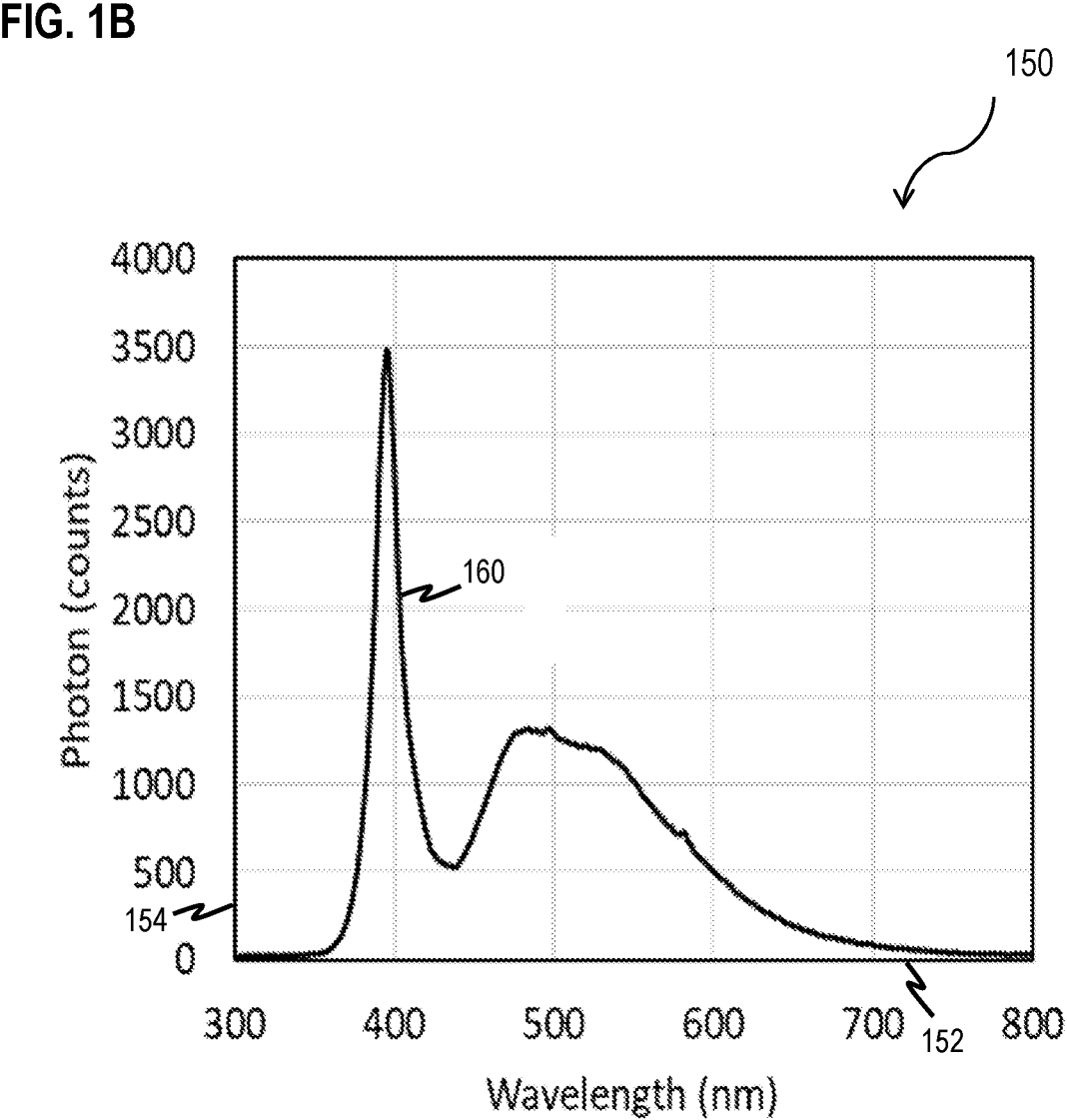
FIG. 1B is a graph that illustrates an example of a spectrum of the optical source of the system of FIG. 1A, according to an embodiment.

In an embodiment, the system 100 includes an optical source 106 to transmit an optical signal 107 at the filter 102. In one embodiment, the optical source 106 is configured so that the optical signal 107 covers a threshold area of the filter 102. FIG. 1B is a graph 150 that illustrates an example of a spectrum of the optical source 106 of the system 100 of FIG. 1A, according to an embodiment. The horizontal axis 152 is wavelength in units of nanometers (nm). The vertical axis 154 is a photon count. As shown in FIG. 1B, the graph 150 includes a curve 160 that indicates the photon count of the light source 106 at each wavelength. In one embodiment, the optical source 106 used in the system includes any light source that covers and/or encompasses the visible light range (e.g. wavelengths in a range from about 380 nanometers or nm to about 700 nm). In an embodiment, the system 100 includes a power supply that supplies power to both the optical source 106 and the imaging device 108 and/or to the pump 104, the optical source 106 and the imaging device 108. In an example embodiment, the controller 110 includes the power supply and/or transmits a signal to the power supply which then subsequently delivers power to the optical source 106, the imaging device 108 and/or pump 104. In one embodiment, the light intensity of the optical source 106 should not exceed an intensity threshold that is based on an exposure limit of the imaging device 108 (e.g. CCD). Thus, in an example embodiment, the optical source 106 is selected so that the intensity of the light does not exceed a maximum intensity threshold that is based on the exposure limit of the imaging device 108. In one example embodiment, a white light LED (light emitting diode) is used as the optical source 106 in the system 100. In an example embodiment, the LED light is continuously on during the sampling period. In one example embodiment, the white light LED is XLamp® XM-L2 LED (model #XMLBWT-00-0000-0000T5051, Cree, Inc., USA).

In an embodiment, the system 100 also includes an imaging device 108 that detects a reflected signal 109 from the filter 102, where the reflected signal 109 is based on the transmitted optical signal 107. In other embodiments, the imaging device 108 detects a transmitted signal (not shown) that passes through the filter 102, based on the optical signal 107 transmitting through the filter 102. In still other embodiments, the imaging device 108 detects a reflected signal from the filter 102 based on ambient light incident on the filter 102 and thus no optical source 106 is required. In an example embodiment, the imaging device 108 is a charge-coupled device (CCD) camera that is used in the system 100 (e.g. OV2640 2MP® camera). In an example embodiment, the OV2640 2MP® is a widely used on-chip camera. One example of the OV2640 2MP® camera is Model #0V2640 from Arducam.

In an embodiment, the imaging device 108 generates an image (e.g. digital image) based on the detected reflected signal 109. In one embodiment, the imaging device 108 detects reflected signals 109 over time, as the filter 102 is exposed to a gas or aerosol containing particulate matter (e.g. acid). In an example embodiment, the imaging device 108 detects the reflected signals 109 over a time period that depends on the level of aerosol acidity that is sampled. In one example embodiment, the time period is about 10 minutes or in a range from about 5 minutes to about 15 minutes for one example value of aerosol acidity (e.g. about 1 µg of sulfuric acid particles). In an example embodiment, the color change observed over this time period is from light yellow to pink. In this example embodiment, a comparison of digital images based on the respective reflected signals 109 over time indicates any color change in the filter 102, which in turn indicates a value of a parameter (e.g. a level of acidity) of the particulate matter in the gas or aerosol. In one embodiment, a controller 110 is communicatively coupled with the imaging device 108 and receives each generated image based on each reflected signal 109 from the imaging device 108. In another embodiment, the controller 110 receives data from the imaging device 108 based on the detection of the reflected signals 109 and the controller 110 generates the image based on the received data from the imaging device 108. In an example embodiment, the comparison of the images is performed by a controller 110 after receiving the multiple images from the imaging device 108.

In an embodiment, the system 100 includes the controller 110 that is communicatively coupled to one or more of the pump 104, the optical source 106 and the imaging device 108. In some embodiments, the controller 110 is in wired communication with the one or more components of the system 100. In other embodiments, the controller 110 is in wireless communication with the one or more components of the system 100. In still other embodiments, the controller 110 is in communication with the one or more components of the system 100 over a wireless network (e.g. online).

Figure 5:
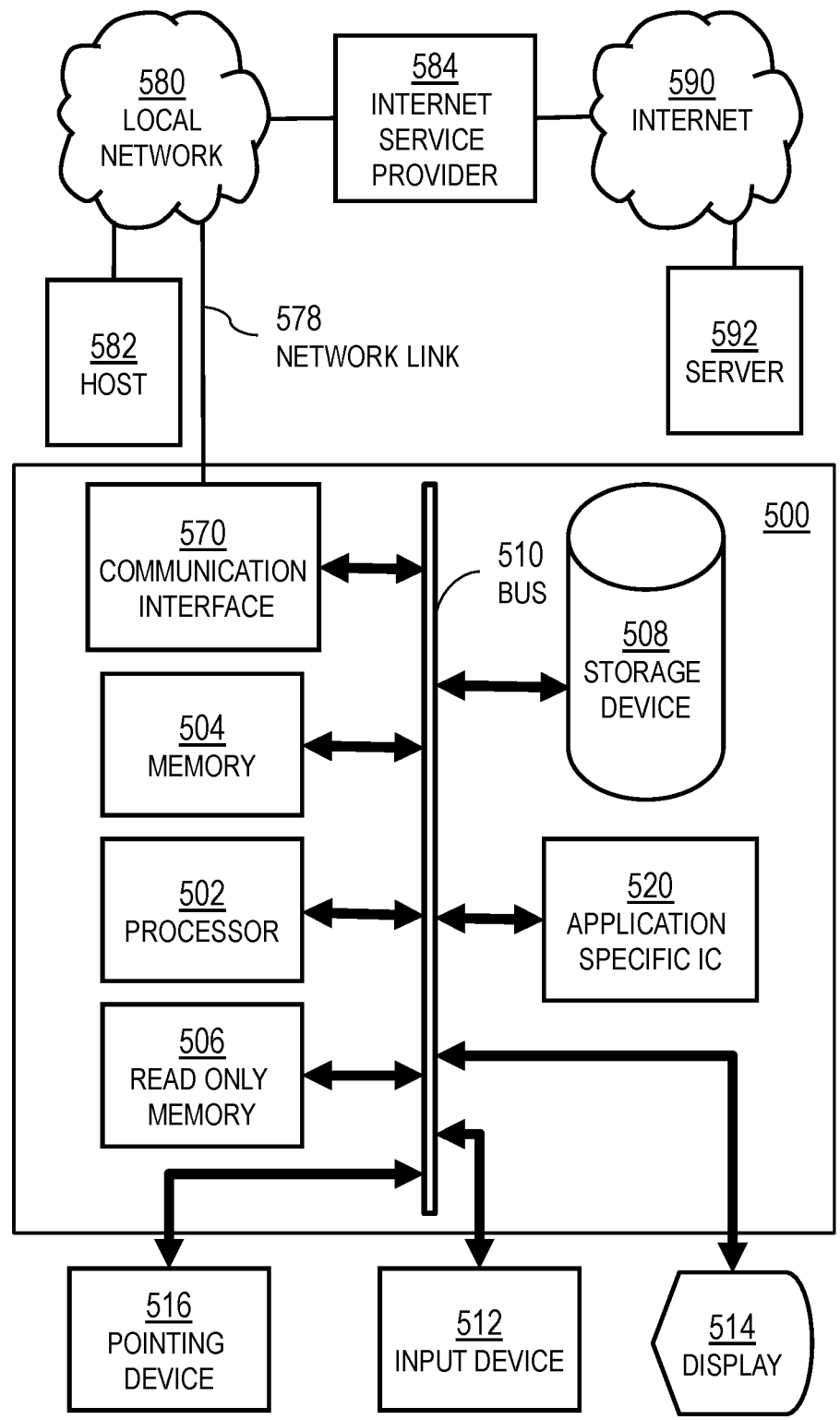
FIG. 5 is a block diagram that illustrates a computer system upon which an embodiment of the invention may be implemented.
Figure 6:
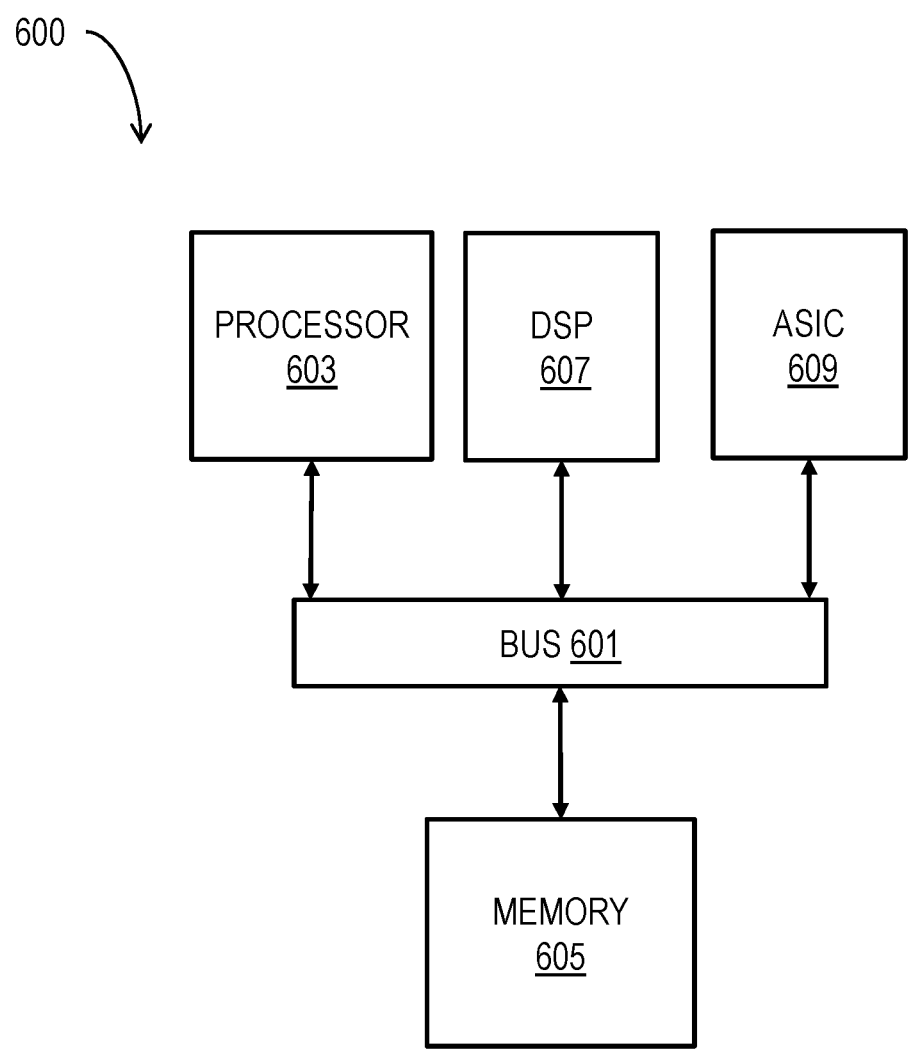
FIG. 6 is a block diagram that illustrates a chip set upon which an embodiment of the invention may be implemented.
Figure 7:
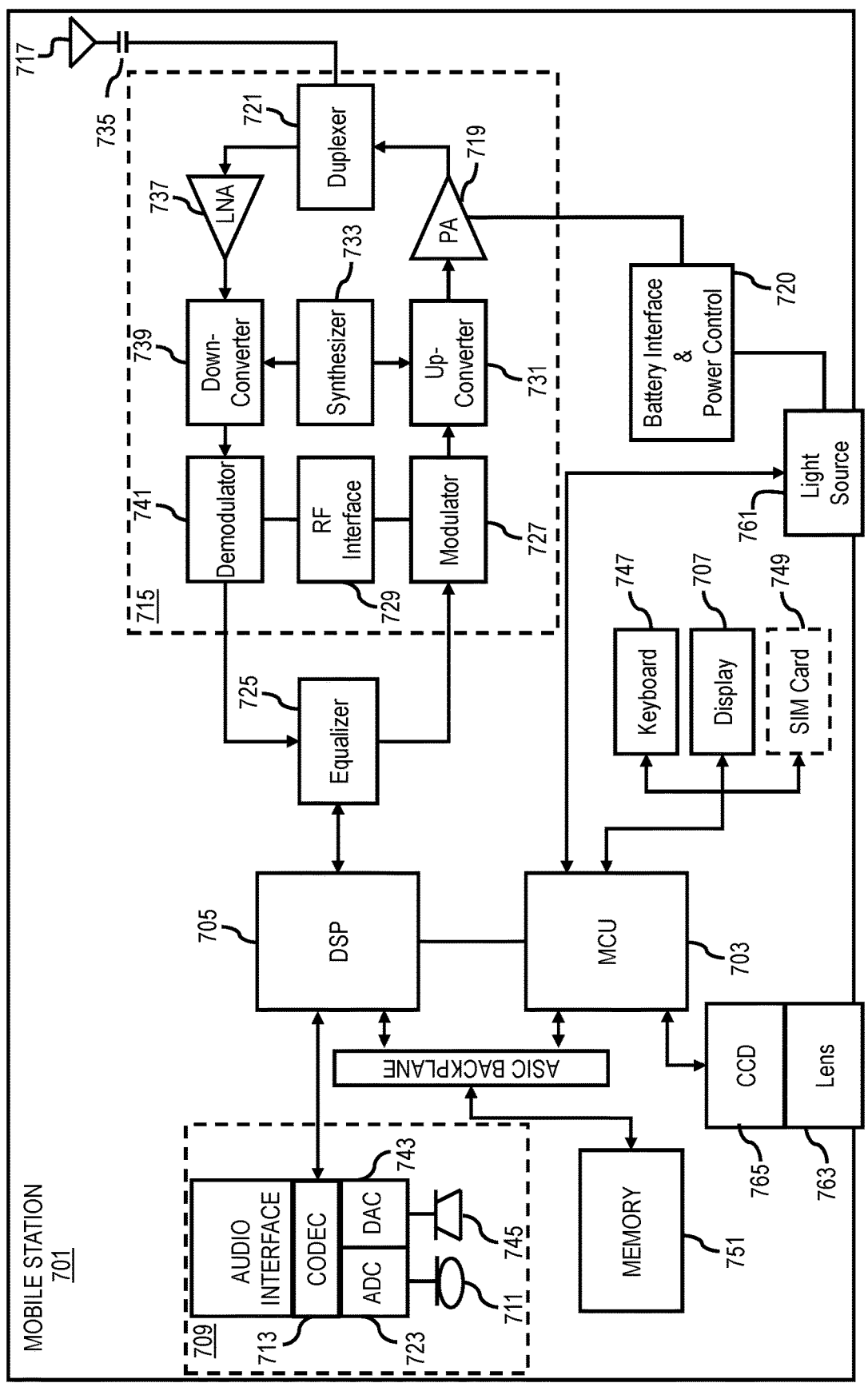
FIG. 7 is a block diagram that illustrates a mobile terminal upon which an embodiment of the invention may be implemented.

In various embodiments, the controller 110 comprises one or more general purpose computer systems, as depicted in FIG. 5 or one or more chip sets as depicted in FIG. 6 or one or more mobile terminals as depicted in FIG. 7.

Additionally, in some embodiments the controller 110 includes a module 111 to perform one or more steps of a method described below with reference to FIG. 4. In an embodiment, the module 111 includes instructions to cause the controller 110 to compare the reflected signals.

Figure 2A:
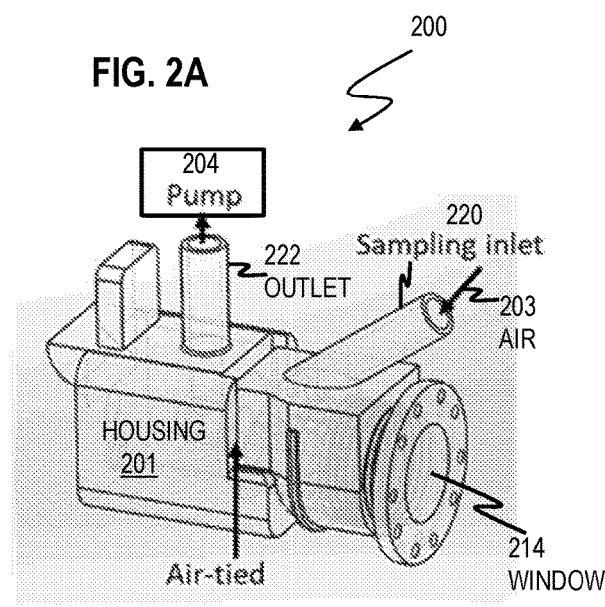
FIG. 2A is an image that illustrates an example of a side perspective view of a system for detecting a composition of airborne particles, according to an embodiment.

FIG. 2A is an image that illustrates an example of a side perspective view of a system 200 for detecting a composition of airborne particles, according to an embodiment. In an embodiment, the system 200 is similar to the system 100 with the exception of the details discussed herein. In an embodiment, the system 200 includes a housing 201 with a sampling inlet 220 and an outlet 222 in flow communication with the sampling inlet 220. In an embodiment, a pump 204 is positioned adjacent to the outlet 222 and is configured to draw air 203 into the sampling inlet 220 and through a channel (not shown) within the housing 201 and out of the outlet 222. Although FIG. 2A depicts the housing with the inlet 220 and the outlet 222, in some embodiments no housing is used and instead air is directed (e.g. with an air flow generating device, such as a pump or a fan) onto the filter 202 that is not positioned within a housing.

Figure 2B:
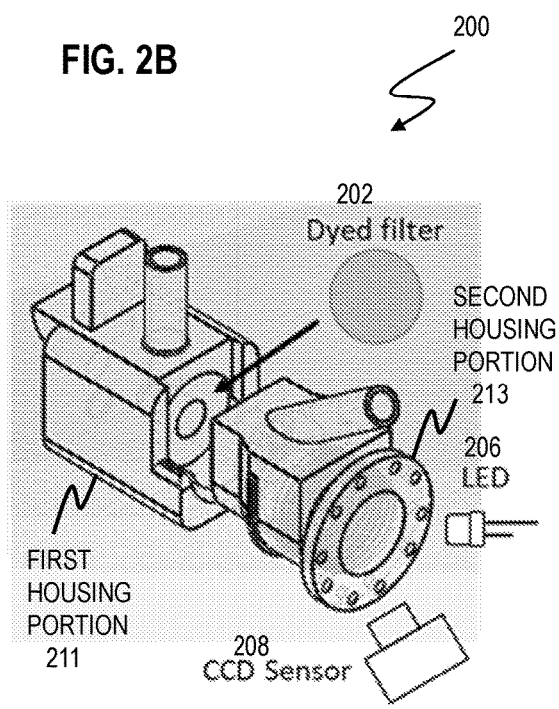
FIG. 2B is an image that illustrates an example of a side perspective view of the system of FIG. 2A and an exposed filter, according to an embodiment.

FIG. 2B is an image that illustrates an example of a side perspective view of the system 200 of FIG. 2A and an exposed filter 202, according to an embodiment. In an embodiment, the filter 202 is mounted within the housing 201 (e.g. in the channel between the inlet 220 and outlet 222). In one example embodiment, the filter 202 is mounted within the housing 201 between a first housing portion 211 (including the outlet 222) and a second housing portion 213 (including the inlet 220). In one embodiment, the filter 202 includes an indicator dye that changes color based on exposure to particulate matter in the gas 203 (e.g. particulate acid in the gas 203). In an example embodiment, the gas 203 is ambient air and the system 200 is to measure a level of particulate matter (e.g. level of acidity) in ambient air.

In one example embodiment, the filter 202 is made of borosilicate glass microfibers reinforced with woven glass cloth and bonded with polytetrafluoroethylene (PTFE). In an example embodiment, the filter 202 is any type of glass fiber filter or quartz fiber filter with and without PTFE coating. In yet another example embodiment, the filter 102 is a quartz microfiber filter (e.g. No. 1851-047, Cytiva, USA). In still another embodiment, the air sampling filter can be replaced with any type of glass fiber filter or quartz fiber filter with and without PTFE coating. In another example embodiment, the part number of the filter is TX40HI20WW and is bought from Pall Corporation of New York, New York. In one example embodiment, the indicator dye is Methyl yellow for the example data. In yet another example embodiment, the indicator dye is Bromophenol Blue and/or Bromocresol Green for less acid particles. In one embodiment, any acid indicator dye (e.g. with pH range less than about a pH of about 5) can be used in this system 200 to measure the aerosol acidity. In another example embodiment, the indicator dye is one or more of methyl green, methyl orange, congo red and ethyl orange.

As with the system 100, the system 200 also includes an optical source, such as a light emitting diode (LED) 206 that transmits an optical signal at the filter 202 and an imaging device, such as a charge-coupled device (CCD) 208 that detects the reflected signal from the filter 202 and/or generates an image (e.g. digital image) based on the detected reflected signal. In one embodiment, as shown in FIG. 2A the housing 201 includes a window 214 that is optically transparent to the transmitted optical signal 207 (from the LED 206) and the reflected signal 209 (to the CCD sensor 208). In an example embodiment, the window 214 is a quartz window which allows the optical signals 207, 209 to pass through to be received by the CCD sensor 208. In an example embodiment, the CCD sensor 208 and the LED 206 are mounted on the window 214. In another example embodiment, the LED 206 is mounted on the window 214 so that the LED 206 is oriented in a manner so that the transmitted optical signal 207 through the window 214 is incident on the filter 202 within the housing 201. In another example embodiment, the CCD sensor 208 is mounted on the window 214 so that the CCD sensor 208 is oriented in a manner so that the reflected signal 209 from the filter 202 and through the window 214 is incident on the CCD sensor 208. In an example embodiment, the CCD sensor 208 and/or the LED 206 are mounted to the window 214 using any means appreciated by one of ordinary skill in the art (e.g. adhesive). In an embodiment, the controller 210 is provided and is in communication (e.g. wired or wireless) with the pump 204, LED 206 and/or the CCD sensor 208. In one example embodiment, the system 200 is low cost such that the components of the system (e.g. LED 206 and CCD sensor 208) can be obtained at a very low cost (e.g. $50 or less).

Figure 2C:
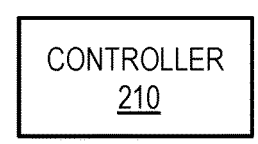
FIG. 2C is an image that illustrates an example of a top view of the optical source and imaging device of the system of FIG. 2B, according to an embodiment.
Figure 2C:
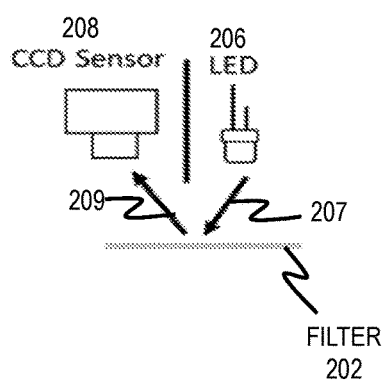

FIG. 2C is an image that illustrates an example of a top view of the optical source (e.g. LED 206) and imaging device (e.g. CCD sensor 208) of the system 200 of FIG. 2B, according to an embodiment. The transmitted optical signal 207 is shown in FIG. 2C incident on the filter 202 and the reflected signal 209 is also shown that is detected by the CCD sensor 208. In an embodiment, multiple reflected signals 209 are detected by the CCD sensor 208 over a time period that the filter 202 is exposed to the gas or air 203 and a plurality of respective images are generated by the CCD sensor 208 over the time period based on the respective detected signals 209. In an embodiment, the controller 210 receives the plurality of respective images from the CCD sensor 208. The color change indicative of the particulate matter (e.g. level of acidity) in the gas or air 203 can be determined over this time period by the controller 210 which compares the multiple images over the time period.

Figure 2D:
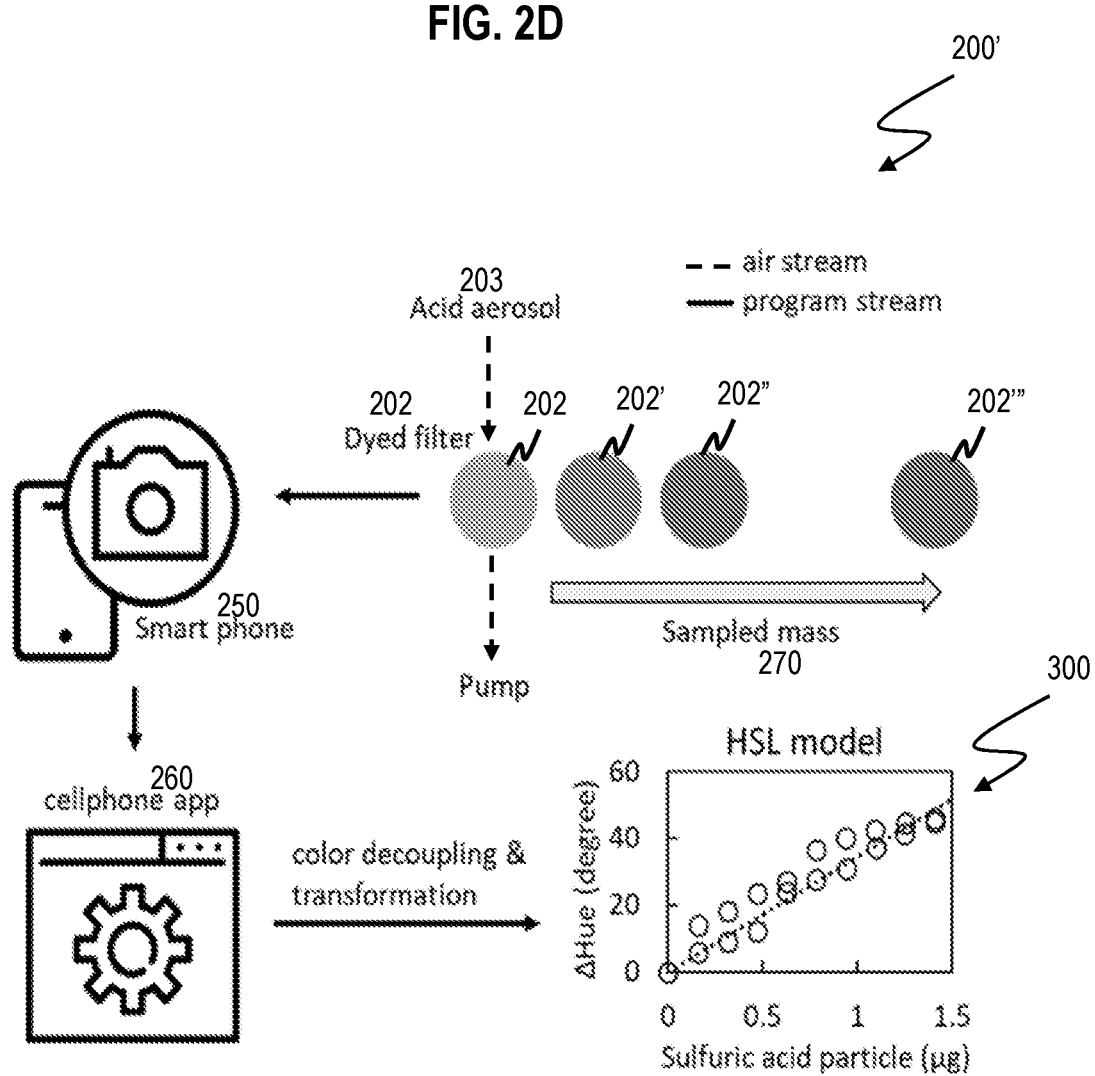
FIG. 2D is an image that illustrates an example of a side perspective view of the system of FIG. 2A with a smartphone camera, according to an embodiment.

FIG. 2D is an image that illustrates an example of a side perspective view of the system 200' of FIG. 2A with a smartphone 250 camera, according to an embodiment. The system 200' of FIG. 2D utilizes a smartphone 250 camera instead of a CCD sensor 208 to detect the reflected signal 209 and/or generate an image of the reflected signal 209. In one embodiment, the smartphone 250 includes an app 260 (e.g. which may or may not be included in the module 111) that includes instructions to generate the image of the filter 202 based on each detected signal 209 and/or transmit the generated image to the controller 210 for processing to assess whether a color change has occurred in the filter 202. In one embodiment, whether a color change has occurred is assessed based on comparing a value of one or more parameters of a first generated image at a first time and the value of the one or more parameters of a second generated image at a second time.

Figure 2E:
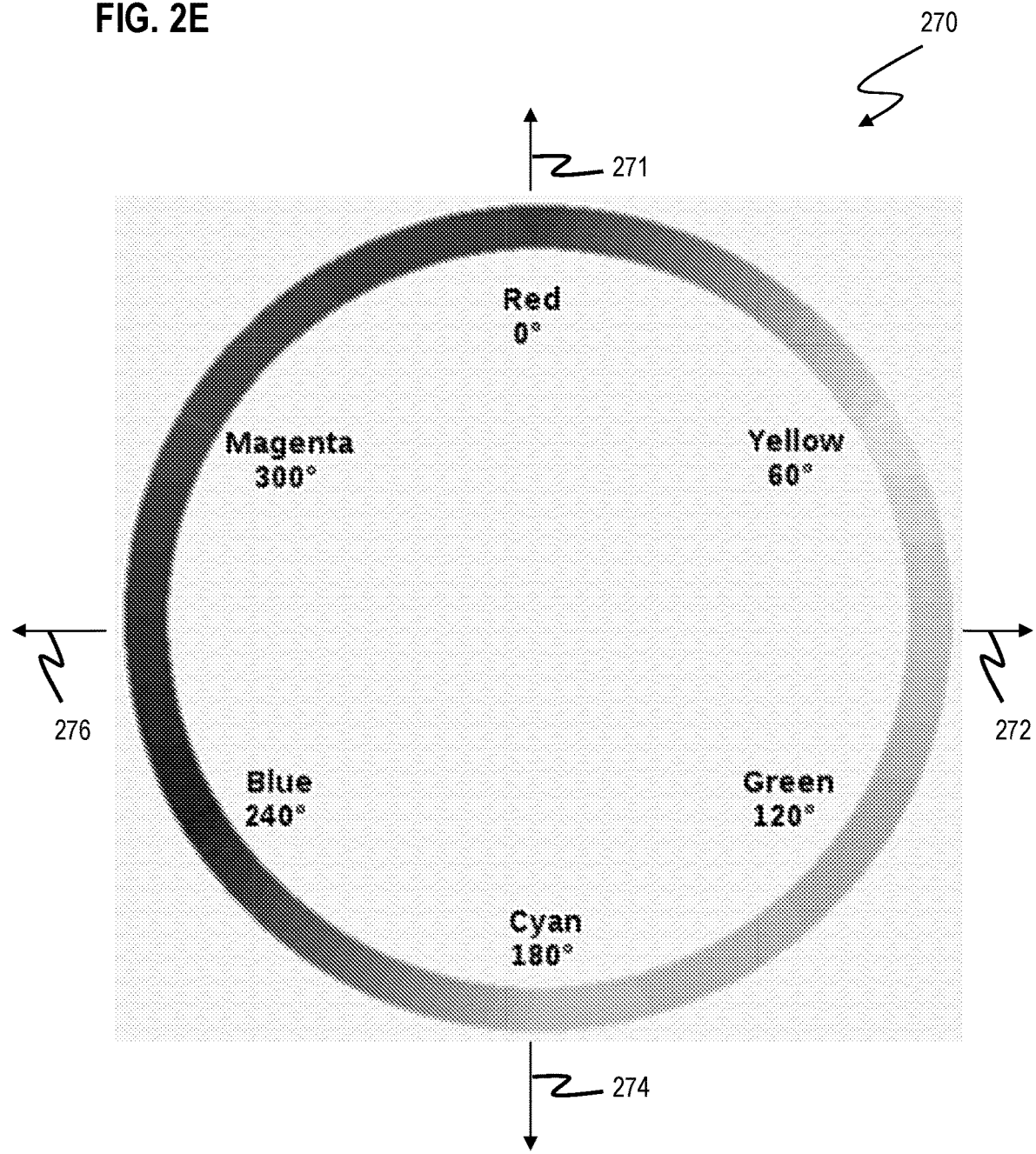
FIG. 2E is an image that illustrates an example of a color circle that is utilized to assess a color of the filter in the system of FIG. 2A through 2D, according to an embodiment.

FIG. 2E is an image that illustrates an example of a color circle 270 that is utilized to assess a color of the filter 202 in the system of FIG. 2A through 2D, according to an embodiment. In an embodiment, the color circle 270 includes a continuous spectrum of colors in the visible spectrum, arranged around a circle. Although the color circle 270 of FIG. 2E labels specific colors at certain angles around the circle, a continuous spectrum of colors is provided around the circumference of the circle. In one embodiment, the color circle 270 includes multiple axes 271, 272, 274, 276 that define values of a hue angle (in degrees) around the color circle 270. The first axis 271 defines 0 hue degrees, the second axis 272 defines 90 hue degrees, the third axis 274 defines 180 hue degrees and the fourth axis 276 defines 270 hue degrees. In the embodiment of FIG. 2A, red is assigned a hue angle of 0 degrees, yellow is assigned a hue angle of 60 degrees, green is assigned a hue angle of 120 degrees, cyan is assigned a hue angle of 180 degrees, blue is assigned a hue angle of 240 degrees and magenta is assigned a hue angle of 300 degrees. As previously discussed, since the color circle 270 provides a continuous spectrum of colors in the visible spectrum, colors between those labeled in FIG. 2E are assigned a hue angle value between those labeled colors. Although one particular color circle is depicted in FIG. 2E, the embodiments of the present invention is not limited to this specific color circle and includes any form of storing a correlation between a continuous spectrum and the hue angle value.

In one embodiment, the color circle 270 is stored in a memory of the controller 110, 210 for purposes of assessing a color change in the filter 102, 202. In an example embodiment, upon receiving an image (or image data) of the filter 102, 202 from the imaging device 108, 208 the controller 110, 210 compares the color of the received image with the colors on the circle 270 and assigns a huge angle value to the color of the received image, based on the color circle 270. In another example embodiment, the controller 110, 210 is configured to determine a color change between two images (captured over a time period) of the filter 102, 202 by first assigning a hue angle value to each image and calculating the change in the hue angle value between the images.

Figure 2F:
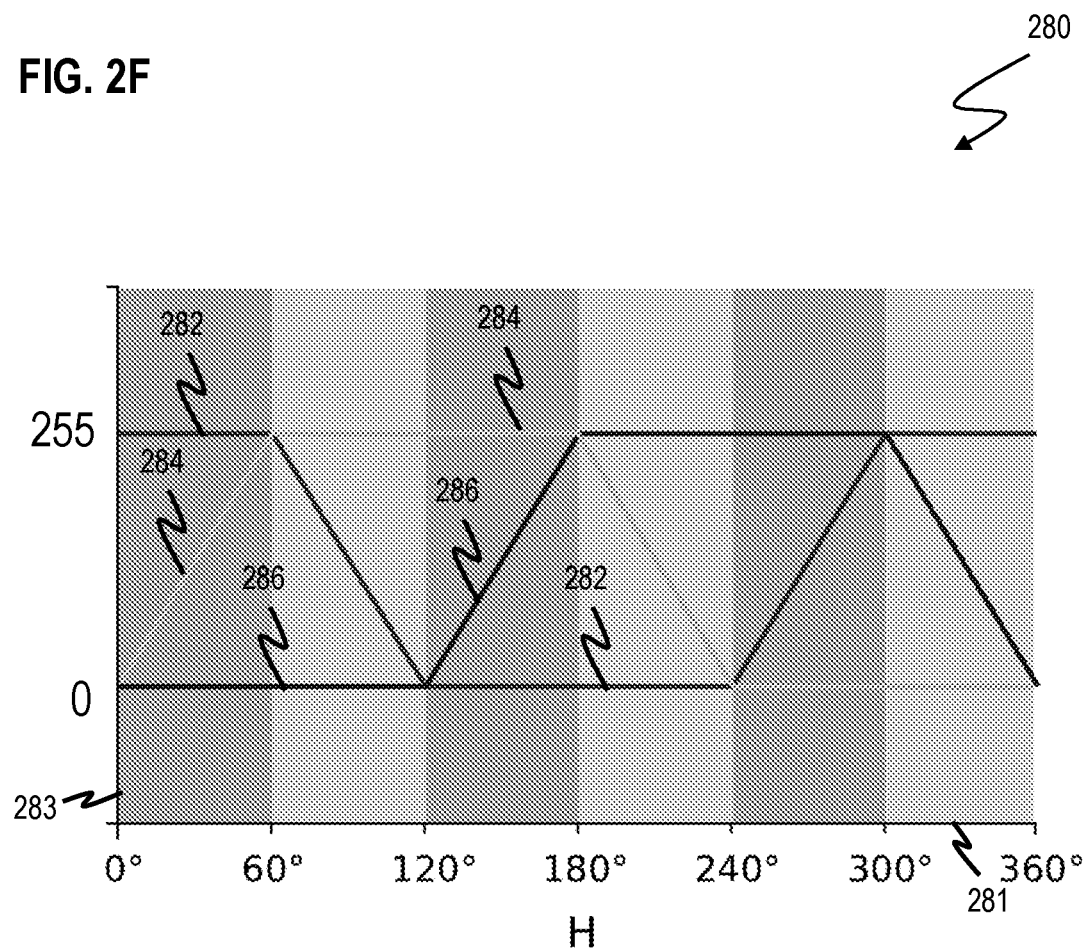
FIG. 2F is a graph that illustrates an example of traces indicating red, green, and blue (RGB) values for the colors in the circle of FIG. 2E, according to an embodiment.

FIG. 2F is a graph 280 that illustrates an example of traces 282, 284, 286 respectively indicating red, green, and blue (RGB) values for the colors in the circle 270 of FIG. 2E, according to an embodiment. In an embodiment, the horizontal axis 281 is the hue angle of the color circle 270 and the vertical axis 283 is a value of the respective red, green, blue (RGB) value of the image. As shown in FIG. 2F, the value of each RGB values varies from 0 to 255. In an embodiment, the traces 282, 284, 286 indicate a value of each of the red, green and blue values for each color (each hue angle) along the color circle 270. In an example embodiment, the hue angle of 0 degrees corresponds to red on the color circle 270 and the traces 282, 284, 286 for the huge angle of 0 degrees indicate that the red value of trace 282 is 255 and the green and blue values of traces 284, 286 are 0. Although FIG. 2F depicts a graph 280 with curves that indicate RGB values of each color, the embodiments of the present invention is not limited to this specific graph and curves and includes any form of storing data of the RGB values of each color.

In one embodiment, the graph 280 includes the traces 282, 284, 286 are stored in a memory of the controller 110, 210 for purposes of assessing a color change in the filter 102, 202. In an example embodiment, upon receiving an image (or image data) of the filter 102, 202 from the imaging device 108, 208 the controller 110, 210 compares the red, green and blue values of the received image with the red, green and blue values in the graph 280 and assigns a color to the received image, based on this comparison. In another example embodiment, the controller 110, 210 is configured to determine a color change between two images (captured over a time period) of the filter 102, 202 by first assigning red, green and blue values to each image and determining the change in the red, green and blue values between the images.

In an embodiment, as the filter 202 is exposed to the gas 203 over time, the color of the filter 202 can change over time, which indicates a sample mass. In an example embodiment, the axis 270 in FIG. 2D is used to show increasing sample mass in the filter 202. As shown in FIG. 2D, at a first time the filter 202 has a first color (e.g. yellow or about 60 degrees on the hue circle 270 of FIG. 2E); at a second time the filter 202' changes to a second color different from the first color (e.g. light brown or about 45 degrees on the hue circle 270 of FIG. 2E); at a third time the filter 202" changes to a third color different from the first and second colors (e.g. brown or about 30 degrees on the hue circle 270 of FIG. 2E); and at a fourth time the filter 202''' changes to a fourth color that is different from the first, second and third colors (e.g. maroon or about 15 degrees on the hue circle of FIG. 2E). Thus, in one embodiment, a first color change of the filter (e.g. from the filter 202 to the filter 202' between the first time and the second time) of a first range indicates a first level of particulate mass (e.g. first level of acidity) in the gas 203. In another embodiment, a second color change of the filter (e.g. from the filter 202 to the filter 202" between the first time and the third time) of a second range that is greater than the first range indicates a second level of particulate mass that is greater than the first level (e.g. second level of acidity greater than the first level of acidity). In another embodiment, a third color change of the filter (e.g. from the filter 202 to the filter 202''' between the first time and the fourth time) of a third range that is greater than the first range and second range indicates a third level of particulate mass that is greater than the first and second levels (e.g. third level of acidity greater than the first and second levels of acidity).

Figure 3A:
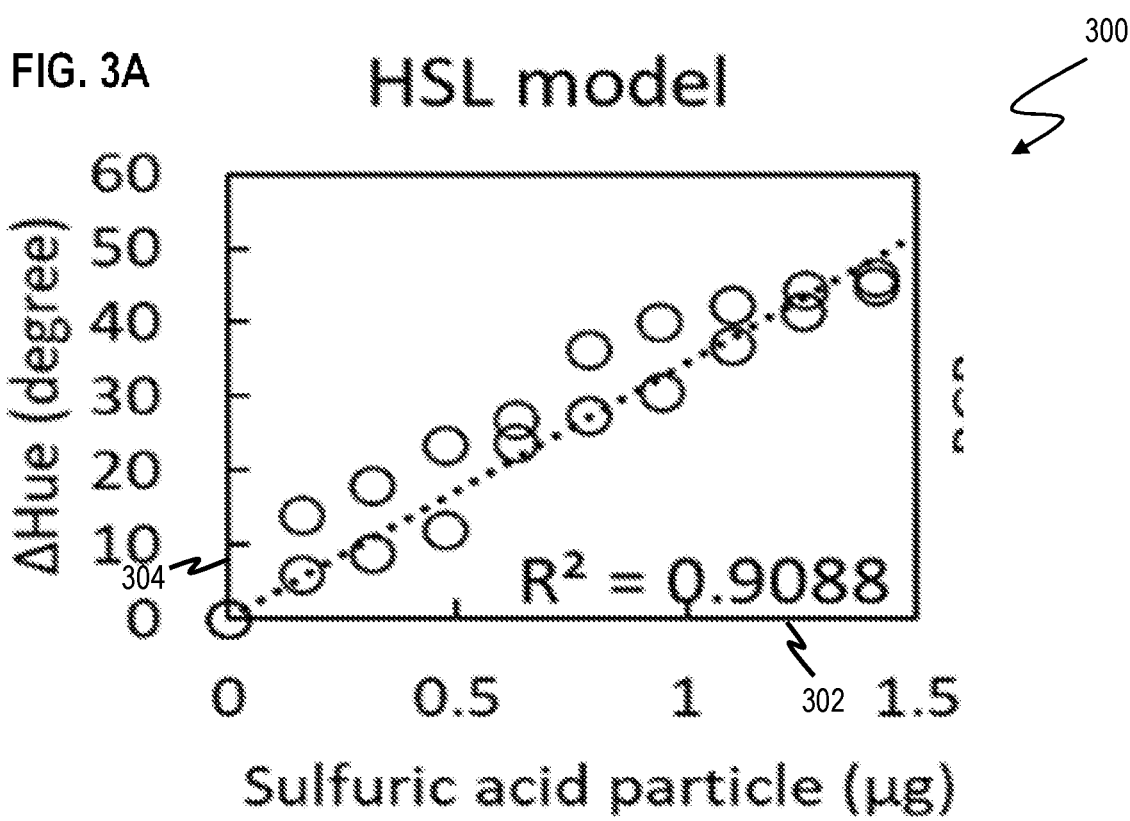
FIG. 3A is a graph that illustrates an example of a first model of a relationship between a composition of airborne particles and a color change of a reflected signal in the system of FIG. 2A, according to an embodiment.
Figure 3B:
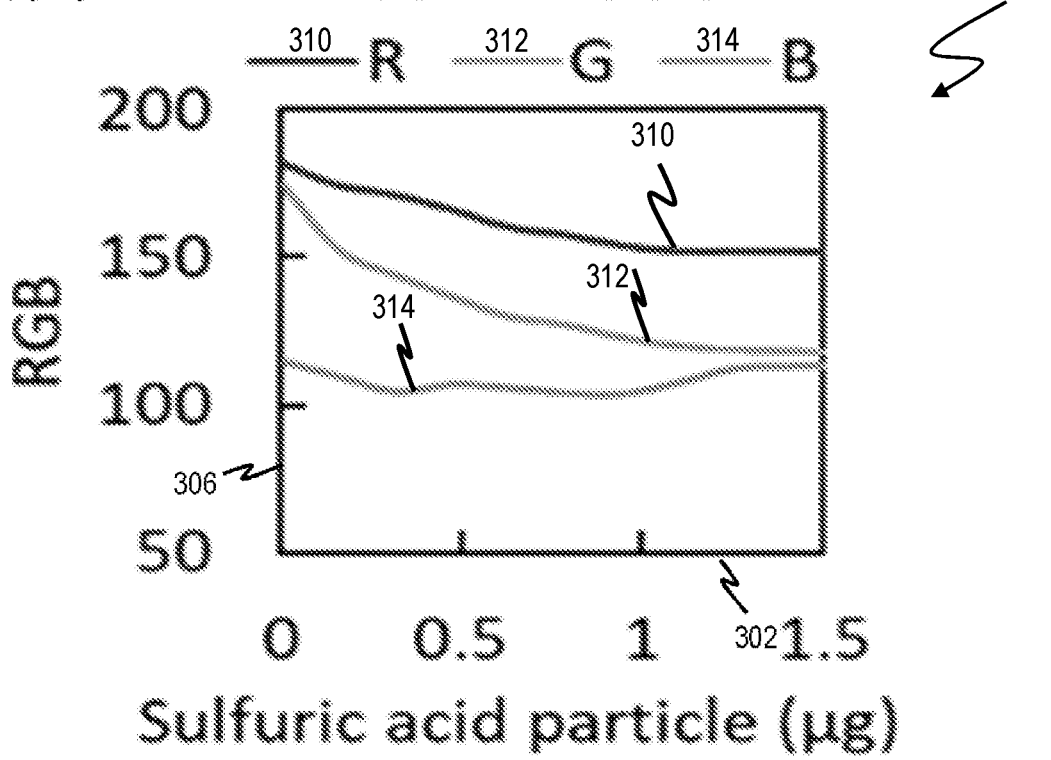
FIG. 3B is a graph that illustrates an example of a second model of a relationship between a composition of airborne particles and a color change of a reflected signal in the system of FIG. 2A, according to an embodiment.

To calibrate the system 200, one or more samples of air 203 with a known level of particulate matter (e.g. known level of acidity) are passed through the inlet 220 and the reflected signals 209 are detected by CCD sensor 208 and/or the image is generated by the CCD sensor 208. In this example embodiment, one or more values of a spectral parameter (e.g. the hue angle value and/or the red, green and blue values) of the image are stored in a memory of the controller 210 for each image, for the known level of particulate matter. FIG. 3A is a graph 300 that illustrates an example of a first model (Hue, Saturation and Lightness or HSL) of a relationship between a composition of airborne particles and a color change of a reflected signal 209 in the system 200 of FIG. 2A, according to an embodiment. The horizontal axis 302 is concentration of sulfuric acid (e.g. that has collected on the filter 202) in units of micrograms. The vertical axis 304 is change in the hue angle in units of degrees. For incremental values of the sulfuric acid along the horizontal axis 302, the gas 203 with this level of acidity is passed through the inlet 220 and the color change of the filter 202 (in units of change of hue degrees) is detected. This data is then stored in the memory of the controller 210 for that particular value of the sulfuric acid level. This process is repeated for incremental values of the level of sulfuric acid along the axis 302. Additionally, this process is repeated for multiple types of particulate matter (e.g. multiple types of acid, other particulate matter other than acid particles, etc.). In one embodiment, the controller 110, 210 determines a linear best fit of the data in FIG. 3A (e.g. using a least squares analysis) to generate a linear curve that can be used to estimate the level of acidity based on the change in the huge angle between two images over a time period. FIG. 3B is a graph 350 that illustrates an example of a second model (Red, Green and Blue or RGB) of a relationship between a composition of airborne particles and a color change of a reflected signal in the system of FIG. 2A, according to an embodiment. In an embodiment, the curves 310, 312, 314 respectively indicate the value of the red, green and blue of the captured image. This model is also used to calibrate the system 200, in a similar manner as the first model of FIG. 3A, with the exception that respective intensities of different spectral components (e.g. red, green and blue values) of the detected reflected signal 209 and/or generated image for each level of acidity is stored in the memory of the controller 210 along with the specific level of the acid.

Figure 4:
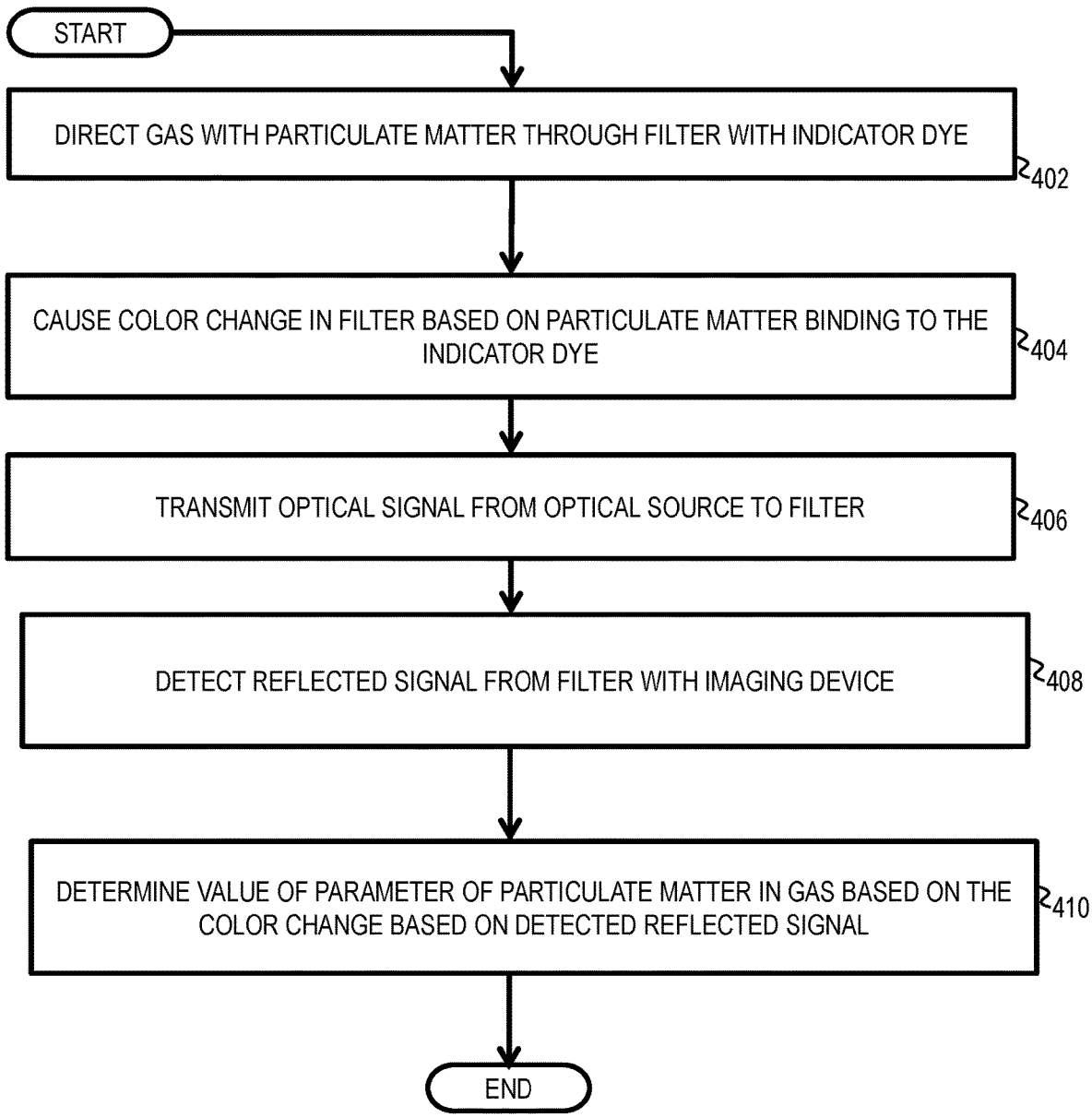
FIG. 4 is a flow diagram that illustrates an example of a method for detecting a composition of airborne particles, according to an embodiment.

Although steps are depicted in FIG. 4 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

FIG. 4 is a flow diagram that illustrates an example of a method 400 for detecting a composition of airborne particles, according to an embodiment. In step 402, gas (e.g. ambient air) with particulate matter is directed through a filter 102, 202 with an indicator dye. In an embodiment, in step 402 the gas 203 with particulate matter (e.g. level of acidity) is directed through the sampling inlet 220 using the pump 204. In one embodiment, in step 402 the controller 210 transmits a signal to the pump 204 to activate the pump 204 (e.g. for a certain time period) so that the gas 203 is drawn through the sampling inlet 220.

In step 404, a color change is caused in the filter 102, 202 based on particulate matter in the gas binding to the indicator dye in the filter 102, 202. In an embodiment, in step 404 the color change occurs over a time period that the gas is being directed through the filter in step 402. In an embodiment, once the target particles are sampled onto the filter 202, the color changes (i.e. step 404) occurs immediately or over a negligible time period. In an example embodiment, the reaction time for the acid particle with dye to show the color change is very small and it can be neglectable. In one embodiment, the time of color change in the actual ambient sampling is impacted by how much acid that is collected by the filter 202. In an example embodiment, in FIG. 3A, it takes about 10 seconds to collect the first data point along the axis 302, which is about 0.1 ug of sulfuric acid on the filter 202. This color change of this first data point can then be used to differentiate between the color change of other data points with different concentrations of acid collected by the filter 202 (e.g. value of each data point along the axis 302).

In step 406, the optical signal 107, 207 is transmitted from the optical source 106, 206 to the filter 102, 202. In an embodiment, in step 406 the controller transmits a signal to the optical source 106, 206 to cause the optical source to transmit one or more optical signals at the filter 102, 202. In an example embodiment, the controller waits for a minimum time period (e.g. the time period over which the color change occurs in step 404) after transmitting the signal to the pump 104 in step 402 so that the color change can occur in step 404 before the optical signal is transmitted in step 406. In one embodiment, the optical signal in step 406 (and reflected signal in step 408) is continuous based on an on/off signal from the controller. In other embodiments, the optical signal in step 406 (and reflected signal in step 408) is discrete based on the signals received from the controller.

In step 408, the reflected signal 109, 209 is detected by the imaging device 108, 208 and/or an image is generated by the imaging device 108, 208 based on the detected signal 109, 209. In an embodiment, in step 408 the controller receives a signal from the imaging device 108, 208 with data indicating the generated image and/or the detected signal 109, 209. In an example embodiment, in step 408, the controller receives data indicating more than one generated image and/or detected signal over the minimum time period of step 406.

In step 410, a value of a parameter (e.g. level of acidity) of particulate matter in the gas 203 is determined based on the detected reflected signal in step 408. In an embodiment, in step 410 the controller determines a change in a spectral parameter (e.g. change in hue degrees, axis 304 and/or change in RBG intensity, axis 306) between multiple images received in step 408. In one embodiment, in step 410 the controller determines a hue angle value (in degrees) for the images captured over the time period (e.g. by comparing the color of each respective image with the colors on the color circle 270 stored in the controller memory). The controller then computes a change in the hue angle value between the images captured over the time period. Similarly, in another embodiment, in step 410 the controller determines red, green and blue values (between 0 and 255) for the images captured over the time period (e.g. by comparing the color of the image with the colors associated with different red, green and blue values in the graph 280). The controller then computes a change in the red, green and blue values between the images captured over the time period.

In an embodiment, in step 410, based on the change in the spectral parameters (e.g. change in the huge angle, change in the RGB values, etc.), the controller compares this determined change in the spectral parameter with stored data in the memory of the controller (e.g. FIGS. 3A-3B data) that correlate change in spectral parameters with known values of parameters (e.g. level of acidity). In this embodiment, in step 410 the controller determines the value of the parameter (e.g. level of acidity) by comparing the change in the spectral parameter with the stored data. In an example embodiment, where the controller determines that the change in the spectral parameter is a change in hue of about 40 degrees, the controller determines that this corresponds with a level of Sulfuric acid of about 1.2 micrograms (see FIG. 3A).

2. Hardware Overview

FIG. 5 is a block diagram that illustrates a computer system 500 upon which an embodiment of the invention may be implemented. Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of one or more methods described herein.

A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitutes computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

Information, including instructions, is provided to the bus 510 for use by the processor from an external input device 512, such as a keyboard containing alphanumeric keys operated by a human user, or a sensor. A sensor detects conditions in its vicinity and transforms those detections into signals compatible with the signals used to represent information in computer system 500. Other external devices coupled to bus 510, used primarily for interacting with humans, include a display device 514, such as a cathode ray tube (CRT) or a liquid crystal display (LCD), for presenting images, and a pointing device 516, such as a mouse or a trackball or cursor direction keys, for controlling a position of a small cursor image presented on the display 514 and issuing commands associated with graphical elements presented on the display 514.

In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a two-way communication coupling to a variety of external devices that operate with their own processors, such as printers, scanners and external disks. In general, the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 570 sends and receives electrical, acoustic or electromagnetic signals, including infrared and optical signals, that carry information streams, such as digital data.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 502, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 502, except for carrier waves and other signals.

Logic encoded in one or more tangible media includes one or both of processor instructions on a computer-readable storage media and special purpose hardware, such as ASIC*520.

Network link 578 typically provides information communication through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides information representing video data for presentation at display 514.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520, may be used in place of or in combination with software to implement the invention. Thus, embodiments of the invention are not limited to any specific combination of hardware and software.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server 592 transmits program code for a particular application, requested by a message sent from computer 500, through Internet 590, ISP equipment 584, local network 580 and communications interface 570. The received code may be executed by processor 502 as it is received, or may be stored in storage device 508 or other non-volatile storage for later execution, or both. In this manner, computer system 500 may obtain application program code in the form of a signal on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red a carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set 600 upon which an embodiment of the invention may be implemented. Chip set 600 is programmed to perform one or more steps of a method described herein and includes, for instance, the processor and memory components described with respect to FIG. *8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of a method described herein.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively, or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 605 also stores the data associated with or generated by the execution of one or more steps of the methods described herein.

FIG. 7 is a diagram of exemplary components of a mobile terminal 700 (e.g., cell phone handset) for communications, which is capable of operating in the system of FIG. 2C, according to one embodiment. In some embodiments, mobile terminal 701, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps as described herein. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (Wi-Fi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 as described herein. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

In some embodiments, the mobile terminal 701 includes a digital camera comprising an array of optical detectors, such as charge coupled device (CCD) array 765. The output of the array is image data that is transferred to the MCU for further processing or storage in the memory 751 or both. In the illustrated embodiment, the light impinges on the optical array through a lens 763, such as a pin-hole lens or a material lens made of an optical grade glass or plastic material. In the illustrated embodiment, the mobile terminal 701 includes a light source 761, such as a LED to illuminate a subject for capture by the optical array, e.g., CCD 765. The light source is powered by the battery interface and power control module 720 and controlled by the MCU 703 based on instructions stored or loaded into the MCU 703.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the items, elements or steps modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

What is claimed is:

1. A method comprising:
   a. directing, with a pump, gas including particulate matter through a filter including an indicator dye;
   b. causing a first color change and a second color change in the filter based on the particulate matter binding to the indicator dye;
   c. transmitting, with an optical source, an optical signal at the filter;
   d. detecting, with an imaging device, a first plurality of reflected signals from the filter over a first time period and a second plurality of reflected signals from the filter over a second time period; and
   e. determining, with a processor, a first value of a level of acidity of the particulate matter based on the first color change, wherein the first color change is based on a comparison of the first plurality of reflected signals detected over the first time period and determining a second value of the level of acidity of the particulate matter based on the second color change, wherein the second color change is based on a comparison of the second plurality of reflected signals.

2. The method of claim 1, wherein the optical source is a light emitting diode (LED).

3. The method of claim 1, wherein the imaging device is one of a charged coupled device (CCD) or a camera of a smartphone.

4. The method of claim 1, wherein the time period is at least 5 minutes.

5. The method of claim 1, wherein the gas including particulate matter is ambient air.

6. The method of claim 1, wherein the determining step comprises determining the first color change based on a change in a spectral component of the reflected signal over the first time period and determining the second color change based on a change in the spectral component of the reflected signal over the second time period.

7. The method of claim 1, wherein the causing the first color change or the second color change comprises causing the first color change or the second color change in the filter based on a change in the level of acidity of the particulate matter.

8. The method of claim 7, wherein the causing the first color change or the second color change is based on the change in the level of acidity of about 0.2 micrograms.

9. The method of claim 1, wherein the causing the first color change or the second color change comprises causing the first color change or the second color change within the visible spectrum.

10. The method of claim 1, wherein the filter is positioned within a housing;
   wherein step c) comprises transmitting the optical signal through an optically transparent window of the housing;
   wherein step d) comprises detecting the first plurality of reflected signals and the second plurality of reflected signals having passed through the optically transparent window of the housing.

11. A system comprising:
   a filter including an indicator dye;
   a pump configured to direct gas including particulate matter through the filter;
   an optical source configured to transmit an optical signal at the filter;
   an imaging device configured to detect a reflected signal from the filter; and
   a processor; and
   a memory including one or more sequences of instructions,
   the at least one memory and the one or more sequences of instructions configured to,
   with the at least one processor, cause the system to perform at least the following,
      direct gas including the particulate matter through the filter;
      cause a first color change and a second color change in the filter based on the particulate matter binding to the indicator dye;
      transmit the optical signal at the filter;
      detect a first plurality of the reflected signals from the filter over a first time period and a second plurality of the reflected signals over a second time period;
      determine a first value of an acidity of the particulate matter based on the first color change, wherein the first color change is based on a comparison of the first plurality of reflected signals detected over the first time period; and
      determine a second value of the acidity of the particulate matter based on the second color change, wherein the second color change is based on a comparison of the second plurality of reflected signals over the second time period.

12. The system of claim 11, further comprising a housing with an inlet and an outlet in flow communication with the inlet, wherein the filter is mounted within the housing between the inlet and the outlet so that the filter is in flow communication with the inlet and the outlet.

13. The system of claim 11, wherein the optical source is a light emitting diode (LED).

14. The system of claim 11, wherein the imaging device is a charged coupled device (CCD).

15. The system of claim 11, wherein the imaging device is a camera of a smartphone.

16. The system of claim 12, wherein the housing includes an optically transparent window and wherein the system is configured to transmit the optical signal through the optically transparent window and wherein the system is configured to detect the first plurality of reflected signals and the second plurality of reflected signals having passed through the optically transparent window.

17. The system of claim 16, wherein the optical source and the imaging device are mounted to the optically transparent window of the housing.

* * * * *